United States Patent
Turner

[11] 3,955,629
[45] May 11, 1976

[54] MECHANICAL QUILL FEED UNIT

[76] Inventor: Frank W. Turner, 70 Sylvan, Pleasant Ridge, Mich. 48069

[22] Filed: Nov. 28, 1972

[21] Appl. No.: 309,957

[52] U.S. Cl. .................................. 173/19; 74/841; 173/146; 173/156; 408/134; 408/137
[51] Int. Cl.[2] .................................. B23B 47/20
[58] Field of Search .......... 408/137, 134, 132, 129; 173/145, 146, 156, 19; 74/841; 29/568

[56] References Cited
UNITED STATES PATENTS

| | | | |
|---|---|---|---|
| 3,160,033 | 12/1964 | Moyer | 74/841 |
| 3,640,147 | 2/1972 | Fantoni | 408/137 X |
| 3,760,490 | 9/1973 | Burg | 29/568 |

FOREIGN PATENTS OR APPLICATIONS

| | | | |
|---|---|---|---|
| 158,231 | 2/1905 | Germany | 408/137 |

*Primary Examiner*—Othell M. Simpson
*Assistant Examiner*—Z. R. Bilinsky
*Attorney, Agent, or Firm*—D. Edward Dolgorukov

[57] ABSTRACT

This application discloses an improved quill feed unit of the type used in automatic or semi-automatic machines for holding and advancing the tool during the machining operation, wherein the rapid advance, feed, and rapid retract movements present in each machine cycle are performed entirely mechanically.

Previously, substantially all of such quill feed units have been operated by the use of a hydraulic or pneumatic power, or a combination thereof, i.e., a hydraulic or pneumatic cylinder would advance and retract the tool, while a suitable motor would rotate the tool.

Despite efforts to solve them, severe problems were and are still encountered with these units. Problems such as leakage, poor start up, tool breakage and ease of tampering are commonplace.

By the complete elimination of hydraulic fluid and air in Applicant's quill feed unit, the problem of start up of hydraulic units due to the thickening of the hydraulic fluid, when cold, are eliminated, as well as the problems of tool breakage, tampering, and leakage.

In Applicant's invention, a single ball-screw assembly performs the rapid advance, feed, and rapid retract operations entirely mechanically without the use of fluids whatsoever. The ball-screw unit itself is driven electrically through planetary or other suitable gearing to perform these operations. Electric motors drive the necessary gearing to operate the unit, as well as drive the tool.

17 Claims, 14 Drawing Figures

MECHANICAL QUILL FEED UNIT

This invention relates to automatic tool holding and feeding units, commonly called "quill feed units", and more particularly to an improved mechanically operated quill feed unit.

Ever since the advent of automatic machine tools there has been a search for a satisfactory method of holding and advancing a tool to perform operations on a workpiece.

Up until the present time, the answer to this search which has been accepted, is the hydraulic quill feed unit, wherein the operations of rapidly advancing the tool to the workpiece, slowly feeding the tool while it performs the desired operation upon the workpiece, and then rapidly retracting the tool, have all been done by hydraulic fluid. However, due to the serious nature of the problems which are still present with the use of hydraulic quill feed units, it has been evident to some in the art there must be a better solution to the problem of holding and advancing a tool which would overcome the serious problems which plague the hydraulic quill feed units in use today.

One of the most serious problems with these quill feed units is the very fact they are hydraulically operated. Due to the inherent nature of the hydraulic fluid which operates the unit, in the morning when the unit is cold, the fluid inside the unit will be relatively thick and viscous, causing the unit to operate slowly and sluggishly until it warms up. Therefore, while the unit is cold, production will be slow and the quality of the work may be adversely affected. For example, if the unit were being used on a finishing operation, a slower than normal feed rate may result in "burning" the work or the tool. Also, the slow, inconsistent feed rate of the unit when cold poses many problems with setting up and sequencing of the automatic machines that these units are used on. In any event, production will be much slower than normal until the unit either warms up, or some other special measures are taken. In an attempt to cure the sluggish operation of hydraulic quill feed units when cold, it was thought that placing an easy adjustable control in a position convenient to the machine operator would enable him to simply increase the hydraulic flow in the morning when the unit is cold, thereby maintaining the correct feed rate.

This only partially solved the problem, as there was a tendency to forget to readjust the control after the unit warmed up, or to spend too much time "adjusting" it, in both cases causing more production problems.

If the control had been turned up when the unit was cold, problems then arise if the control is not turned down when the hydraulic fluid warms up and becomes less viscous.

Similar problems such as "burning" the tool or the work will be present when the feed rate is too fast as will happen when the hydraulic fluid heats up to a higher than normal temperature.

In addition, continued exposure of the O-Rings and other seals to high temperatures will contribute to the leakage and pollution problems of the unit due to seal damage and shortened seal life.

Since the control needs to be easily adjustable and convenient, a new major problem arose, that of tampering with the operation of the unit by workers of the type who are inclined to slow down the production line at every chance. A simple twist of the adjustment knob on a hydraulic quill feed unit can slow production immensely and may be very difficult to diagnose. Much time may be spent with the unit, trying to find out what is wrong, when, in reality, there is nothing the matter, except for the unauthorized adjustment of the feed rate on one quill feed unit.

Another major problem with hydraulic quill feed units is the problem of what happens when the tool being fed into the workpiece meets an unexpected obstruction, either in the workpiece itself, or one intentionally placed in the tool's path to cause a machine breakdown. The hydraulic type of quill feed unit presently in use will just keep trying to feed the tool into the work with the result that the tool would, usually, break.

In addition, to the above-mentioned problems, with the present major concern with pollution of the environment, a new problem with hydraulic quill feed unit has come to the attention of machine designers which was not even known to them to be a problem until a short time ago.

This problem is concerned with the seemingly inherent nature of hydraulically operated tools to leak. The hydraulic fluid which leaks from such tools inevitably finds its way onto the factory floors and from there into the sewer system, from where it pollutes our streams and rivers. Also, the hydraulic fluid which leaks out will tend to pollute the factory atmosphere by producing obnoxious fumes and the like. To avoid this pollution problem, machine designers are now trying to design machines which depend as little as possible on the use of hydraulic fluid as a power transmitting means.

Accordingly, one of the objects of the present invention is to provide an improved quill feed unit in which the drive for said unit is entirely mechanical with no hydraulic fluid used whatsoever.

Another object of the present invention is to provide an improved quill feed unit which is not dependent on temperature for its speed of operation.

A further object of the present invention is to provide an improved quill feed unit whose feed rate is easily adjustable by an authorized person setting up the unit, but when adjusted, can't be tampered with by the machine operator.

A still further object of the present invention is to provide an improved quill feed unit which presents no problems of pollution.

A still further object of the present invention is to provide an improved quill feed unit wherein provision is made to stop feeding the machine tool when an obstruction is met.

A still further object of the present invention is to provide an improved quill feed unit which is resistant to slowdown attempts by production line workers.

A still further object of the present invention is to provide an improved quill feed unit which accomplishes the above objects, is mechanically operated, is quiet and simple in operation and relatively simple and inexpensive to manufacture.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology used herein is for the purpose of description and not of limitation.

Applicant, as one of a large number of those skilled in the art of building automatic production machines, has recognized the serious nature of the shortcomings of hydraulic quill feed units and has expended considerable time and money in inventing and developing a successful mechanically operated quill feed unit.

Applicant, as a manufacturer of hydraulic quill feed units was in a unique position to know of all the problems with hydraulic units, such as variation in feed when the unit is cold, ease of tampering with the feed rate of the unit, ease of intentional tool breakage in the units, and the seeming perpetual leakage of hydraulic units.

Applicant, realizing the necessity of a completely new approach to the problem and the elimination of fluid power to drive the quill feed unit, has invented a quill feed unit having the normal rapid advance, feed, and rapid retract strokes of the conventional hydraulic unit, but entirely mechanically driven to eliminate the above mentioned problems. In addition, applicant provides for a positive dwell stop, peck-drilling apparatus, and other cycling arrangements if desired.

Figure 1:
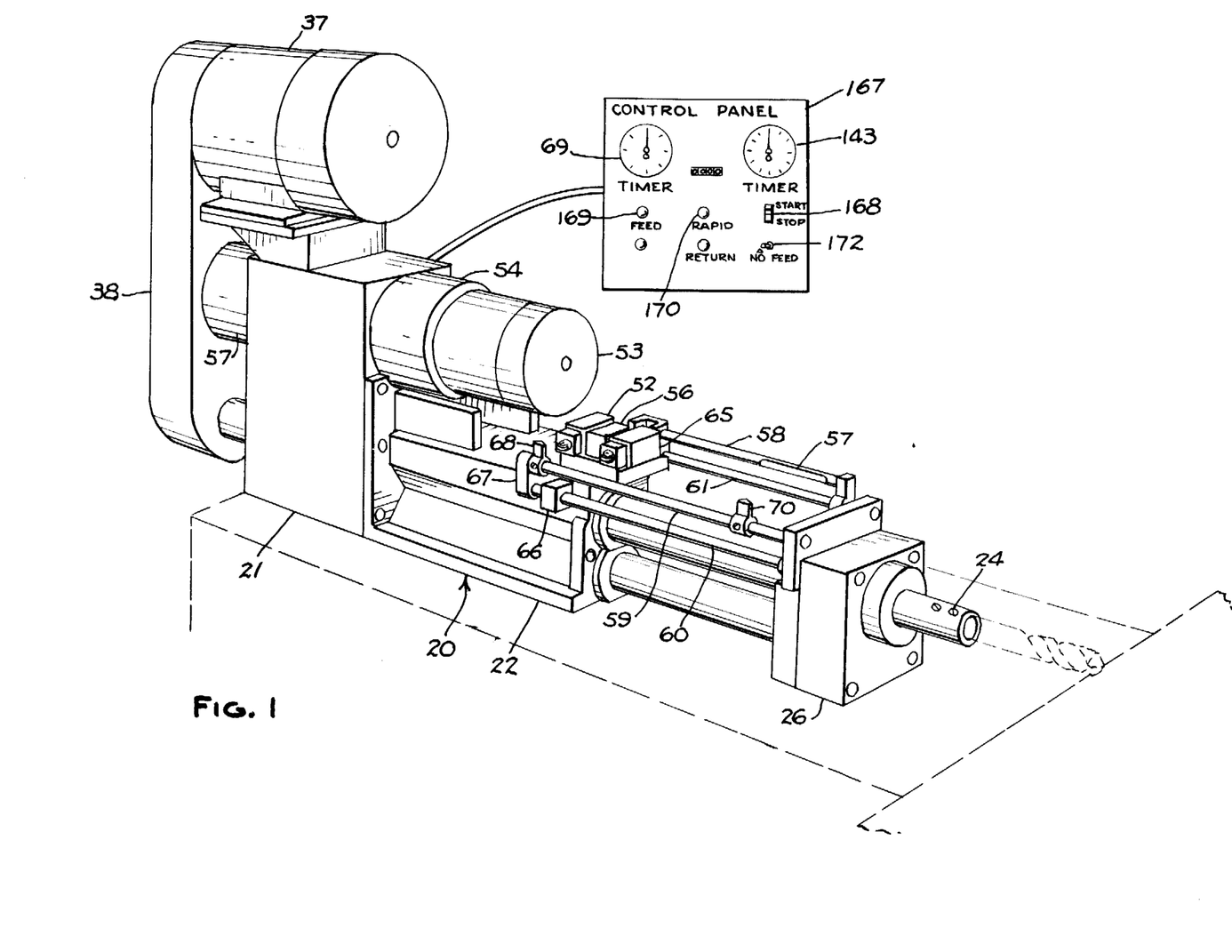
FIG. 1 is a perspective view of a mechanical quill feed unit embodying the present invention, together with its control panel.
Figures 2, 3:
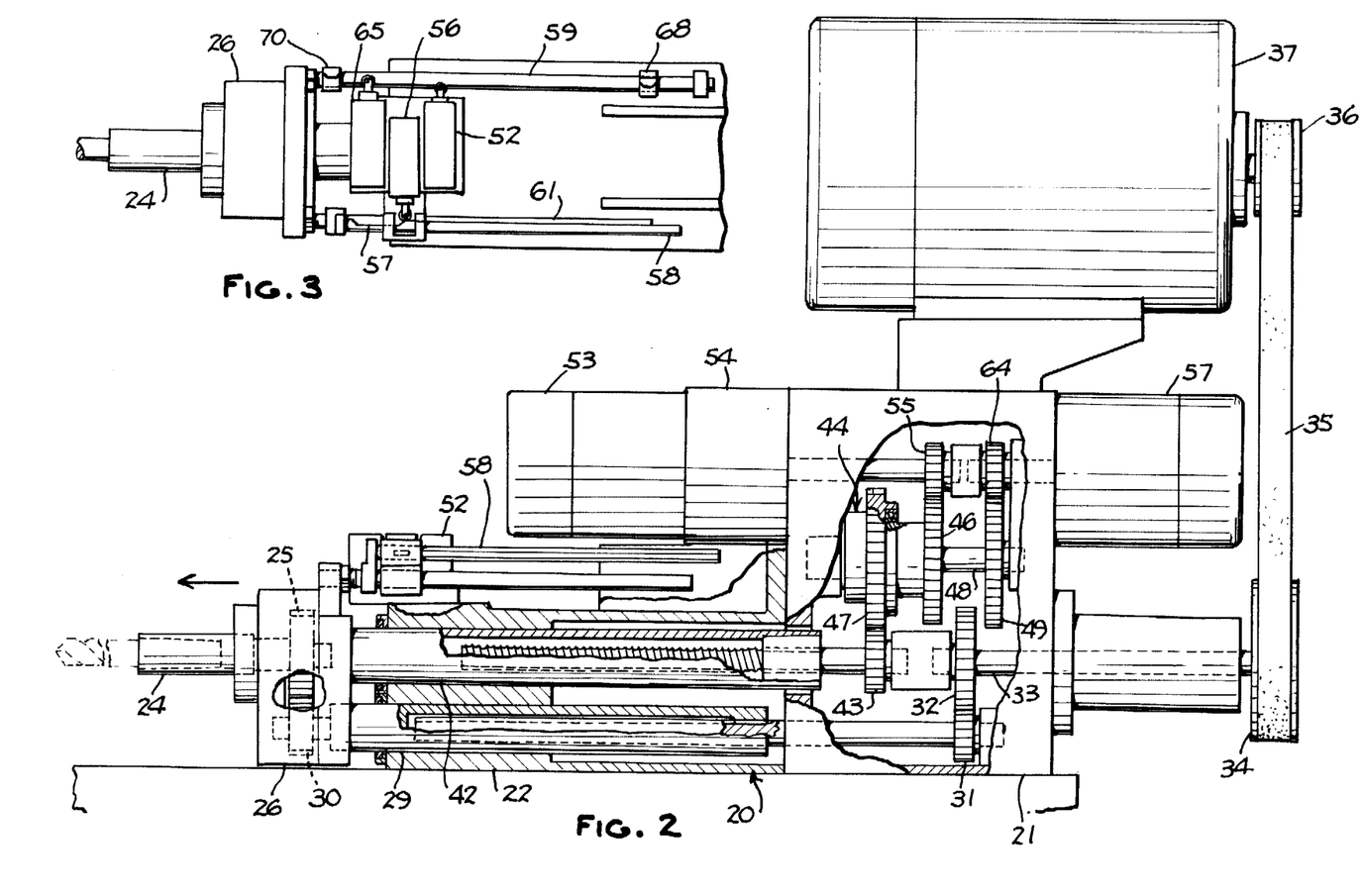
FIG. 2 is an elevational view, partly cut away, of a mechanical quill feed unit embodying the present invention.
FIG. 3 is a partial plan view of the construction shown in FIG. 2.

Referring to FIGS. 1–3, a suitable frame member, generally designated by the numeral 20, and including a gear housing 21 and a bed portion 22 is provided.

A rotatable tool holder 24, driven by the gear 25, is provided on the tool quill 26. To drive the gear 25, and thereby the tool holder 24, regardless of the position of the tool quill 26, a hollow splined driveshaft 29 is slidably carried by the frame member 20, and connected by means of a spur gear 30, to the gear 25, thereby driving the tool holder 24. The hollow splined shaft 29 is connected by means of a gear 31 and a gear 32, to a shaft 33. Connected to the shaft 33, is a drive pulley 34, connected by a belt 35 to a drive pulley 36, fixedly mounted to the drive motor 37.

It can be seen that by virtue of this construction, the tool holder 24 will be positively and uniformly driven regardless of how the tool quill 26 is positioned. It can be seen that the drive mechanism and the feeding mechanism (to be described) can be reversed in position. However, Applicant prefers to have the feed in-line with the tool to prevent a possible problem with cantilever action of the tool quill when resistence is met.

A belt guard 38 (see FIG. 1) may be provided over the belt 35 to prevent injuries and tampering.

In order to advance the tool quill toward or away from the work, a ball-screw mechanism 42 is slidably carried by the frame member 20, and is connected at one of its ends to the tool quill 26. At its opposite end it is connected by a gear 43 to the reducing planetary output gear 47 of the planetary gearset generally designated by the numeral 44.

Such reducing planetary gearsets are well known in the art and need not be described in detail herein, except to say that a direct drive can be accomplished by using only the planetary input gear 46 and planetary output gear 47, or an indirect drive may be accomplished through the planetary input shaft 48, and gears 47 and 49, with the planetary input gear 46 held stationary by some suitable means.

When it is desired to rapidly advance the tool quill toward the workpiece to a point just before tool penetration, a direct drive through the planetary input gear 46, planetary output gear 47, and gear 43 to the ball-screw 42 is used.

To accomplish this, at the start of a machine cycle, the operator, or prior machine sequencing mechanisms, through the control panel 167 will turn on the rapid advance motor 53 and feed motor 57 carried by the frame member 20, and de-energize the brake 54, allowing the rapid advance motor to freely drive the gears 55 and 64.

It should be understood that the feed motor doesn't have to be switched on at all while the rapid advance motor is on, but can remain off until the rapid advance motor is shut off and braked, and then switched on. However, Applicant prefers the feed motor to be switched on at some point before the rapid advance motor is shut off to prevent any delay while waiting for the motor to come to speed, and to avoid jerkiness in operation.

The rapid advance motor 53 will drive the ball-screw 42, and thus the tool holder 24, directly at a rapid rate of speed through the series of gears 55, 46, 47 and 43, and will continue to do so until the cam 57 strikes and operates the limit switch 56. At this time, the rapid advance motor 53 will shut off, and the brake 54 will be energized.

The result of this is that the planetary input gear 46 of the gearset 44 will be held stationary because the brake will be on preventing gear 55 from turning.

Now begins the slow or feeding portion (mode) of the cycle wherein any tool which may be placed in the tool holder 24 is moved into or past a workpiece at a slow rate of speed for a predetermined time. While the brake 54 is energized, the already running feed motor 57 will indirectly drive the ball-screw 42 at a greatly reduced speed through the combination of gears 64, 49, 47 and 43.

The reduction will be in the neighborhood of 80-1 by driving through the interior of the planetary gear set. It should be understood that the particular reduction obtained is dependent on the particular planetary gear chosen, a wide range of which are available.

Also, the final rapid advance and feeding speed of the units depend on the particular gears 43, 46, 47, 49, 55, and 64 which are used. Applicant has purposely provided in this illustration of his invention that these gears be what is known in the art as "pick-off" or "quick-change" gears. This allows quick set-up of the unit during job changeovers, with the advantage that once the unit is set up, it can't be speeded up or slowed down by anyone tampering with the unit, as was the case with hydraulic quill feed units, since all these gears are enclosed in the gearcase 21 during operation. However, Applicant's invention is not limited to the use of these gears and where there is no need for quick changes, standard gears can be used.

Another feature of the Applicant's invention is that if an obstruction is presented to a machine tool being operated by the Applicant's device, intentionally or otherwise, the tool will not just keep advancing and ultimately break, as with the old hydraulic units but instead the forward feed will be stopped.

This is accomplished by virtue of the brake 54 being adjustable as to the amount of torque needed to make it slip. If the ball-screw 42 can't turn, thereby holding the gears 43 and 47 stationary, the feed motor 57 will start driving the rapid advance motor 53 through the gears 64, 49, 46 and 55, thereby overriding the brake, rather than breaking a tool.

At the end of a normal feed cycle, to start the rapid retract, and thereby complete the cycle of Applicant's quill feed unit, when cam 68 contacts the limit switch 52, this will turn off the feed motor 57, deenergize the brake 54, and reverse the rapid advance motor 53, which will cause the tool quill 26 to retract until the cam 70 carried by the cam mounting bar 59 contacts and operates the limit switch 65.

It can be seen that while the feed motor can be run during the rapid advance portion of the cycle with no harm, making the total rapid advance speed equal to the rapid advance speed plus the feed, and can be left on during the rapid retract, making the total rapid retract speed equal to the rapid return speed minus the feed, the feed motor must always be shut off at the end of the rapid retract, or else the cam 70 will continually be moved off the limit switch 65 and the unit will not shut off. This can cause serious problems where the unit is used on automated machine lines and the like.

In some machining applications, it has been found by those skilled in the art that a better result is obtained when a constant or uniform chip load is maintained on the cutting tool. Since chip load varies directly with the feed and rotation of the cutting tool, to maintain a constant chip load, it is necessary to have the feed rate directly related to the RPM of the cutting tool. This was never possible with the old hydraulic quill feed units. However, Applicant in accordance with his invention, provides a modification of his mechanical quill feed unit which accomplishes the uniform chip load and is relatively simple and inexpensive to manufacture.

Figure 4:
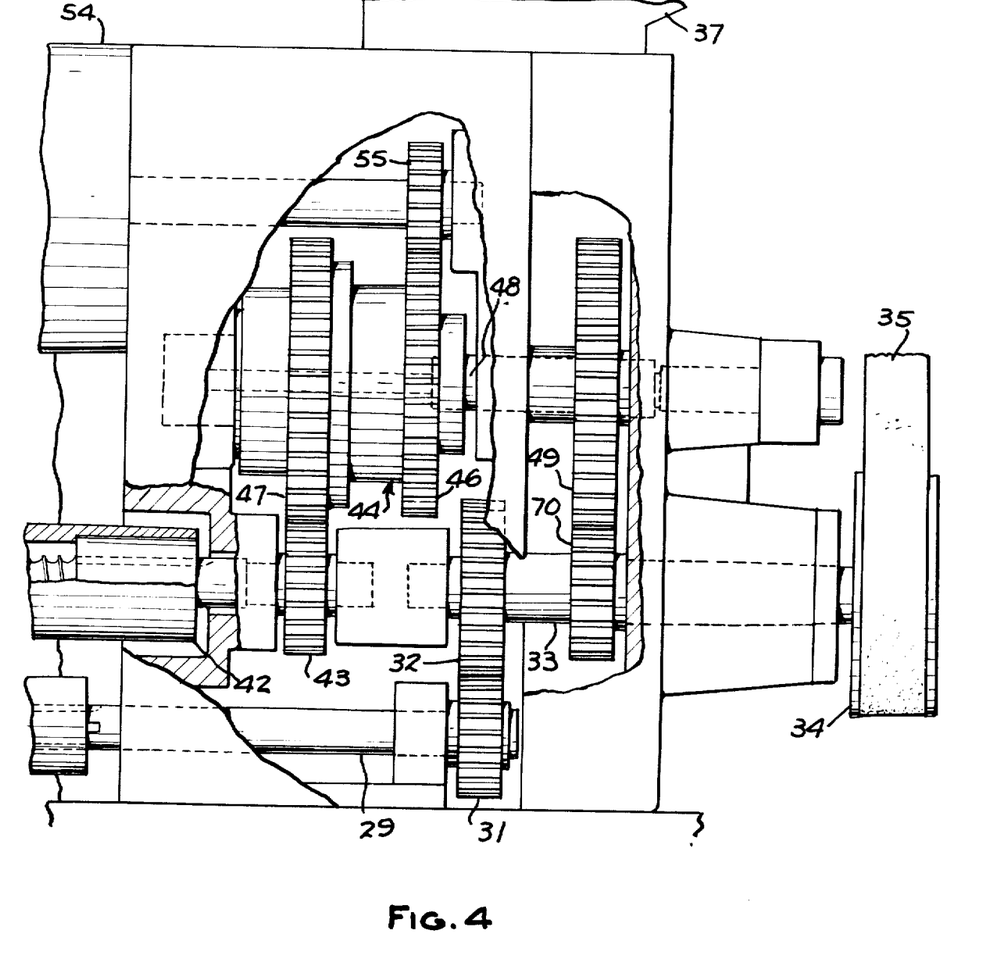
FIG. 4 is a partial elevational view showing a modification of the present invention.

Referring to FIG. 4, a partial cutaway view of the driving components of this modification are shown.

The hollow slip shaft 29 driving the tool holder is driven in the same manner as before by gears 31 and 32, shaft 33, pulley 34, belt 35, pulley 36 (not shown), and spindle motor 37.

The rapid advance and retract portions of the machine cycle also take place as previously described through the rapid advance motor 53 (not shown), brake 54, gears 55, 46, 47, 43, and ball-screw 42. The operation of the limit switches which control the cycles and their operation, having been just described, need not be repeated.

Applicant has, however, replaced the feed motor in this embodiment of the invention with an extra gear 70 on the shaft 33. This gear drives the gear 49, which, in turn, drives the planetary input shaft 48 in the previously described manner.

It can be easily seen that when the spindle feed motor 37 varies in speed, for any reason, by virtue of this construction not only will the hollow driveshaft 29 to the tool holder 24 vary in speed accordingly, but the drive to the planetary gearset will change speed in direct proportion, thus assuring a uniform chip load in those applications where it is needed.

Figure 5:
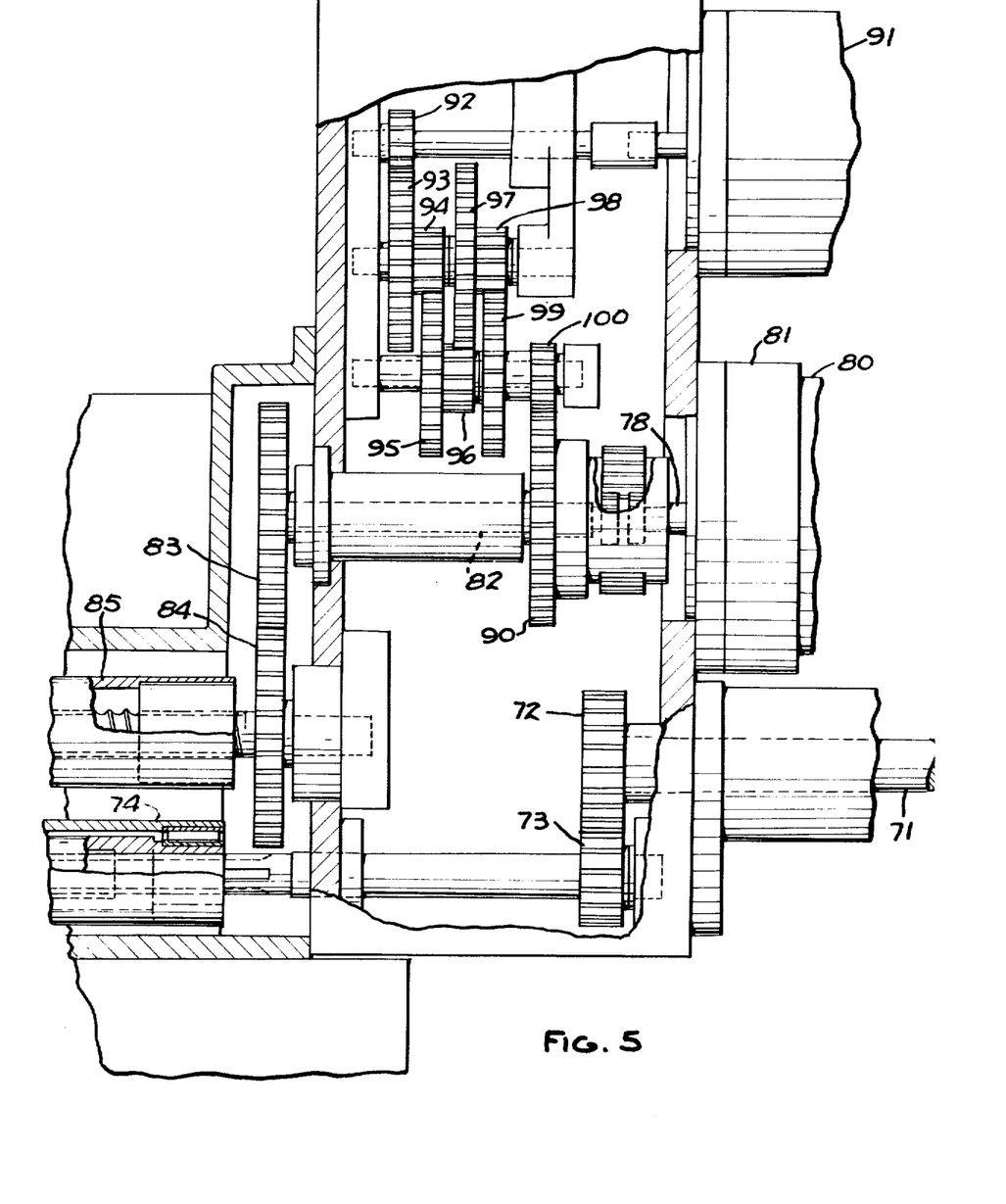
FIG. 5 is a partial cut-away elevational view showing another modification of the present invention.

Applicant has also found that in some machining applications, it may be economically advantageous for him to build his mechanical quill feed unit using a non-reducing planetary gear, rather than a reducing planetary gear as previously described. An embodiment of Applicant's invention using such a gear is shown in FIG. 5.

The spindle drive is accomplished through the spindle drive shaft 71, and gears 72 and 73, driving a hollow slip shaft assembly 74, in a manner similar to that previously described. A non-reducing planetary gear having input gear 90, planetary input shaft 78, and planetary output shaft 82 is provided.

When the rapid advance motor 80 is switched on and the brake 81 de-energized, the drive through the non-reducing planetary gearset will be direct. However, when the rapid advance motor 80 is turned off and the brake 81 is energized, the ball screw 85 will be rotated much slower. This is due to the fact that when rapid advance motor 80 is shut off, the planetary input shaft 78 will be held stationary. Therefore, the only driving of the planetary output shaft 82 is accomplished by the planetary input gear 90. Planetary input gear 90 is being driven very slowly by the feed motor 91 through a series of pick-off gears 92, 93, 94, 95, 96, 97, 98, 99 and 100, thus the ball-screw 85 will also rotate very slowly. The feed motor 91 and the rapid advance motor 80 are controlled by the various cams and limit switches previously described.

Figure 6:
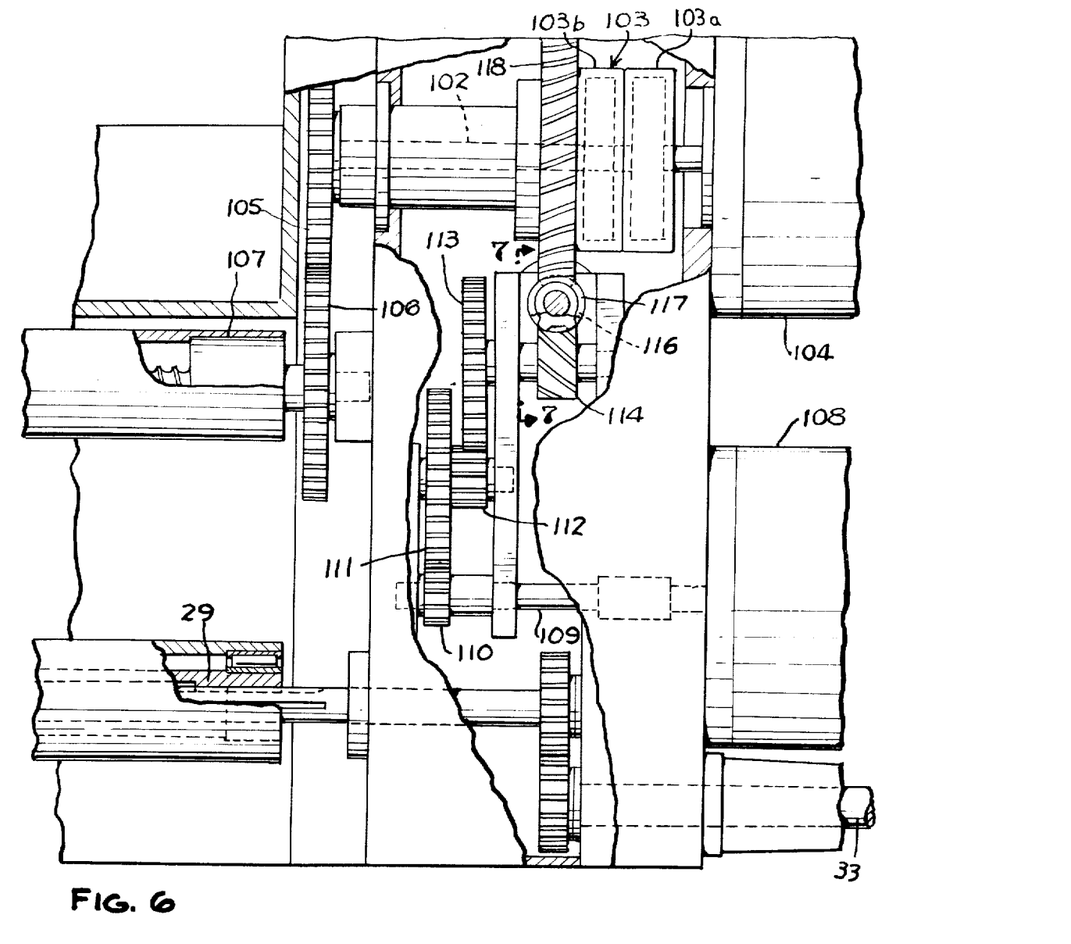
FIG. 6 is a partial cut-away elevational view showing still another modification of a construction embodying the present invention.
Figure 7:
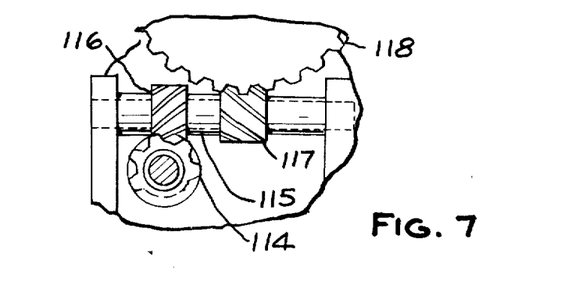
FIG. 7 is a sectional view taken in the direction of the arrows on the section line 7—7 of FIG. 6.

In applications where it may prove advantageous, Applicant has provided an embodiment of his invention using a helical drive for the feed, as shown in FIGS. 6 and 7. In this modification, an overrunning dual purpose clutch, generally designated 103, is provided on the rapid advance motor 104 instead of a brake. When the rapid advance motor 104 is on, one portion 103a of the dual clutch 103 is engaged, causing clutch output gear 105 to be directly driven by shaft 102. This, in turn, drives gear 106 and ball-screw 107.

However, when the rapid advance motor 104 is off, the other portion 103b of the clutch 103 is engaged, and portion 103a is disengaged, causing the clutch output gear 105 to be disconnected from the motor 104 but connecting clutch input gear 118 to shaft 102. With the feed motor 108 now running, power is transmitted through the shaft 109 to the gear 110 and by way of the combination of gears 111, 112 and 113 to the helical gear 114. The helical gears 116 and 117 carried on the shaft 115 complete the transmission of power from the feed motor to clutch input gear 118 carried on the overrunning clutch 103.

Figure 8:
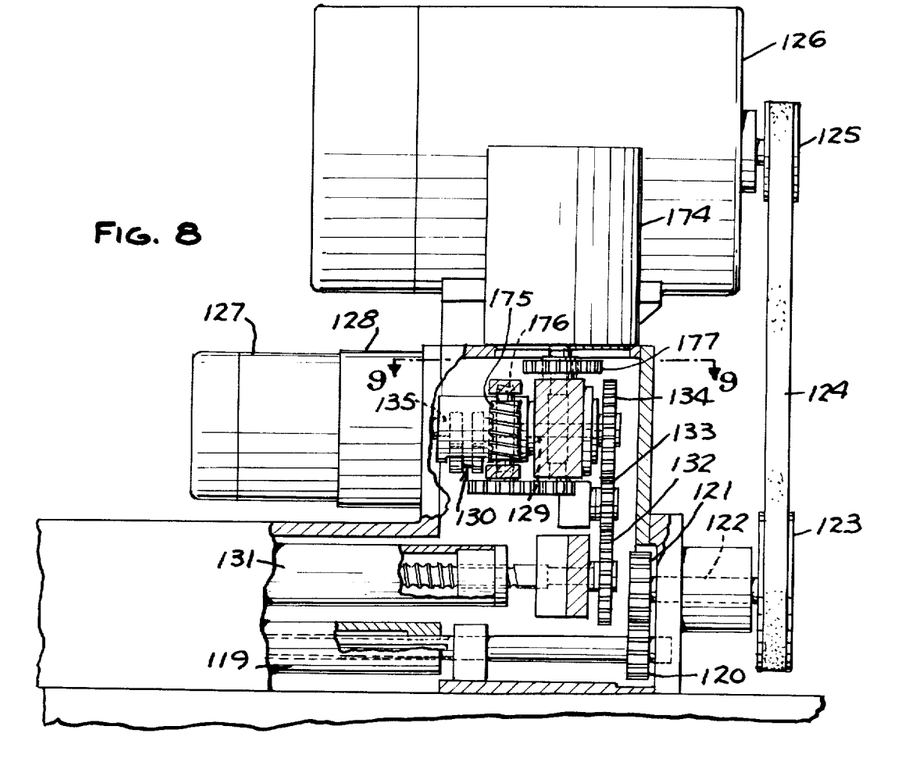
FIG. 8 is a cut-away, partial elevational view of a construction embodying the present invention wherein a worm drive is used for the feed.
Figure 9:
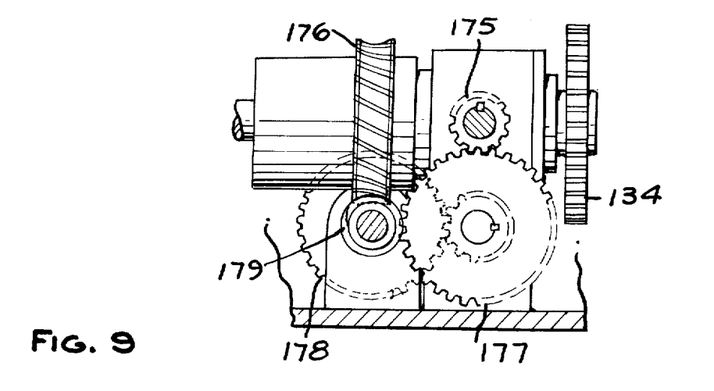
FIG. 9 is a sectional view taken in the direction of the arrows on the section line 9—9 of FIG. 8.

Therefore, when clutch 103b is engaged, the gear 105 is driven at a greatly reduced rate of speed by the gear 118, through the shaft 102, resulting in the gear 106 and the ball-screw 107 being rotated at a greatly reduced speed for the feed cycle.

Where heavy loads or other factors make the use of a worm drive for the feed desirable, Applicant has developed the modification shown in FIGS. 8 and 9. In this embodiment of Applicant's invention, the spindle drive is again accomplished in the conventional manner through a hollow splined shaft 119 drivingly connected to the spindle drive shaft 122 by means of gears 120 and 121. The spindle drive shaft is driven by pulley 123 through the belt 124 and drive pulley 125 by the spindle drive motor 126.

When the rapid advance motor 127 is turned on, and the brake 128 is de-energized, the non-reducing planetary gearset 130 will directly drive the ball-screw 131 through the gears 132 and 133, as well as gear 134, which is driven by the planetary output shaft 129. However, when the rapid advance motor 127 is switched off and the brake 128 is energized, thereby holding the planetary input shaft 135 stationary, the feed motor 174 will indirectly drive the ball-screw 131 through the feed motor gear 175 driving the planetary input gear 176 through the series of gears 177 and 178 as well as the worm 179, thus driving said ball-screw at a greatly reduced speed for the feed portion of the machining cycle.

Figure 10:
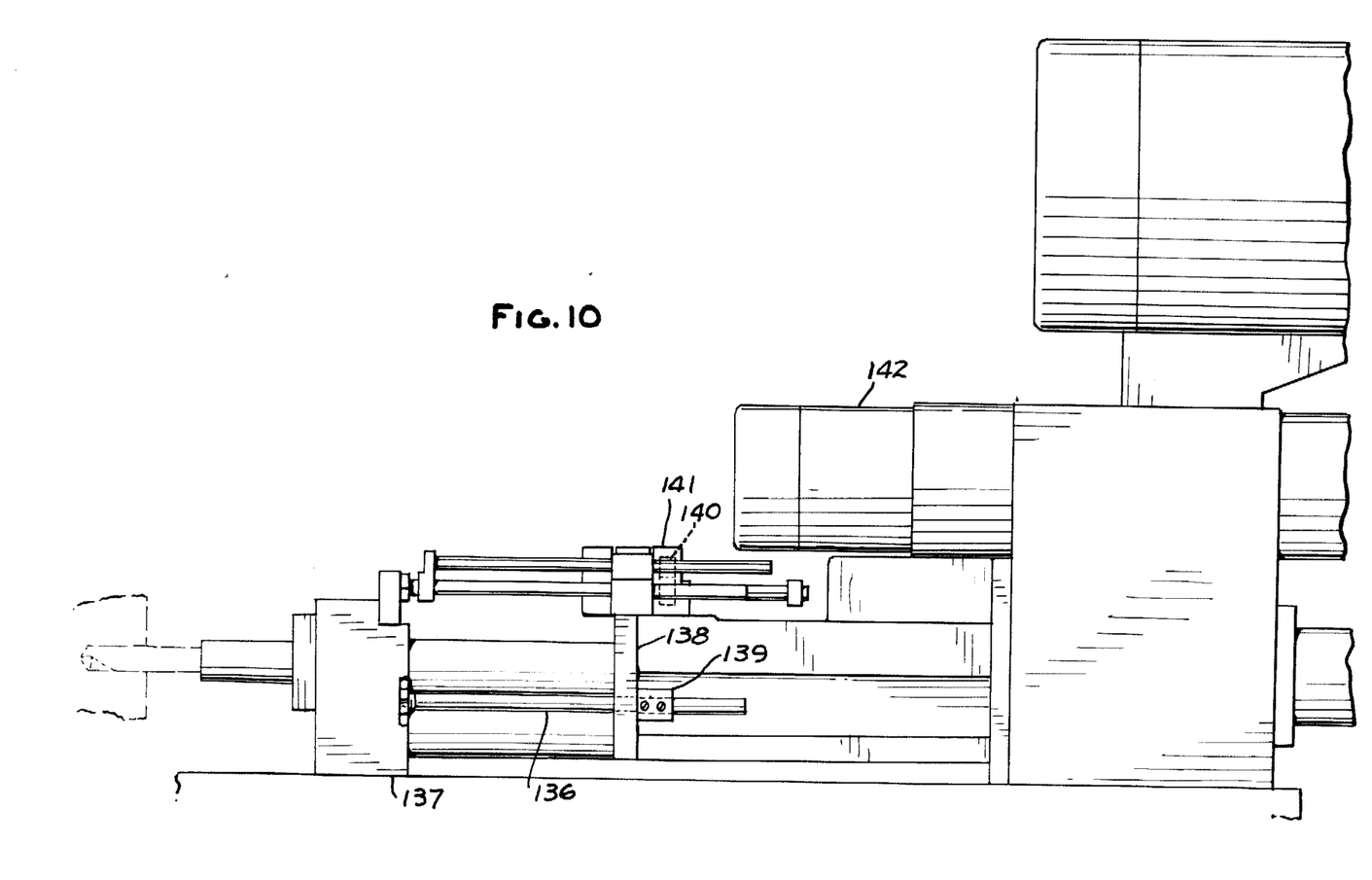
FIG. 10 is an elevational view of a construction embodying the present invention showing the adjustable positive dwell stop.

In a machining operation where it is necessary that the feed intentionally stop at a predetermined point for a certain length of time, Applicant has provided his mechanical quill feed unit with a positive dwell stop as shown in FIG. 10. It should be understood that this feature of Applicant's invention can be used with any of the modified drives just discussed.

In this construction, an additional cam mounting bar 136 is provided which is fixedly mounted to the tool quill 137. A suitable stop member 138 is provided on the frame of the unit. It can be seen that when the adjustable collar 139 contacts the stop 138, the forward feed of the unit will stop, causing the brake to slip as previously mentioned. To insure that this will occur, it is necessary to set the appropriate cam 140 to contact and operate the limit switch 141 to start a timer 69, which allows the quill to continue forward until collar 139 contacts stop 138 and then allows the quill 137 to dwell at this position for a predetermined time. This is necessary for the reason that an electrical switch will never operate precisely the same way twice. At the end of the dwell cycle, the timer 69 will reverse the rapid advance motor 142 to retract the quill 137 and shut off the feed motor.

In machining operations involving the drilling of very deep holes, where the tool must be repeatedly fed into the workpiece and withdrawn to clear the chip (an operation called "peck-drilling" in the art) Applicant has developed the embodiment of his invention shown in FIGS. 11-14.

A special cam mounting bar 144, having a flat portion 145, is fixedly mounted to the tool quill 146. Mounted to the frame of the unit is a special mounting block 147 which slidably holds cam 148 in operating contact with limit switch 149. Limit switch 149, when contacted by the cam 148 being slid forward, will turn off the rapid advance motor, apply the brake, and start a timer 143 to time the feed motor. This is similar to what happens in the standard units previously described.

However, instead of a fixed cam starting the feed cycle, a special slidable cam 150 operates the limit switch. The cam 150 is held on the bar 144 by an adjustable tensioning device 151 pushing on the flat portion 145 of the bar 144.

Figure 11:
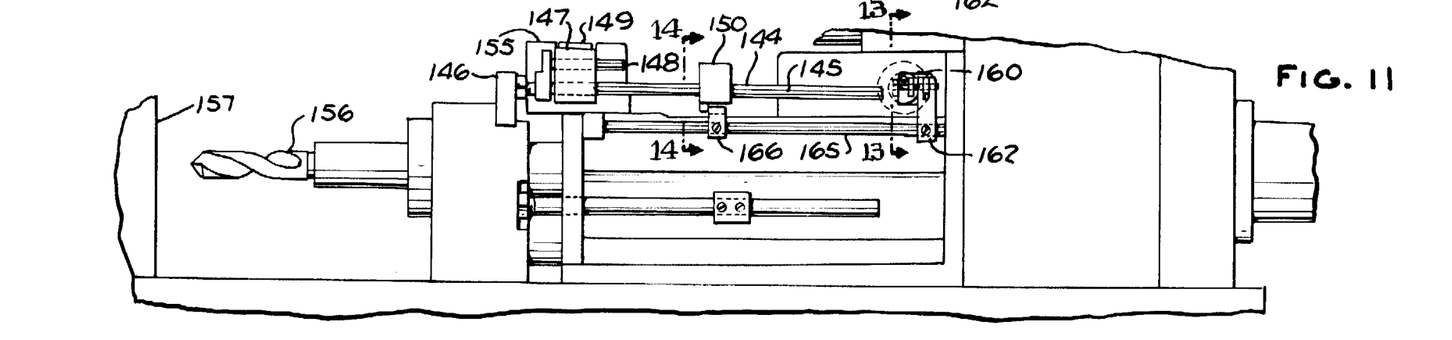
FIG. 11 is a partial elevational view of a construction embodying the present invention and showing the equipment necessary for peck-drilling installed thereon.

At the start of the peck-drill cycle, shown in FIG. 11, the cam 150 is set where the feed cycle is to begin, shown here by the letter A. The quill feed unit will rapidly advance to this point, at which time, the cam 150 will contact cam 148 which will be pushed forward to operate limit switch 149 to start the feed cycle and activate the timer 143, which will time the duration of the feed cycle.

Figure 12:
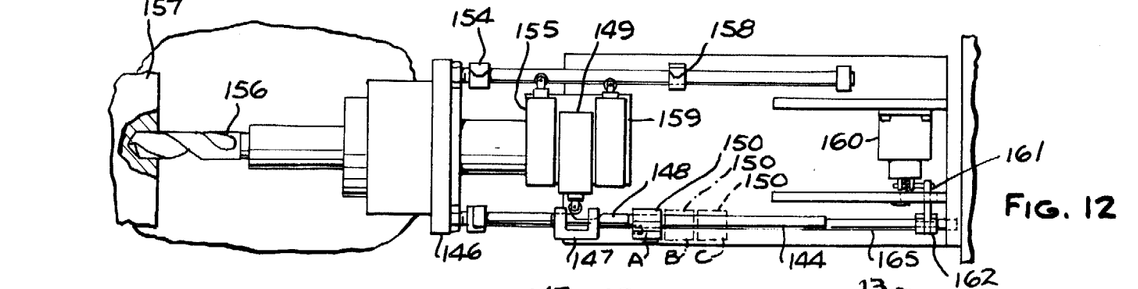
FIG. 12 is a partial plan view of the construction shown in FIG. 11, but with the tool quill partially extended and with the tool having penetrated the workpiece.
Figure 13:
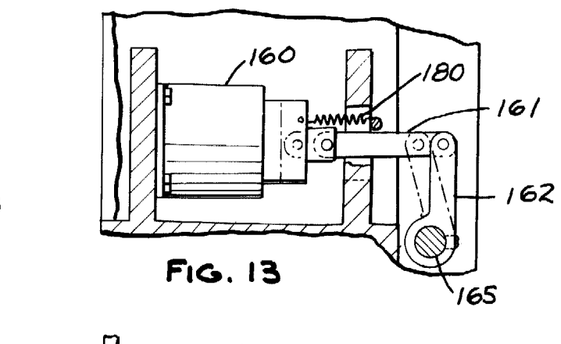
FIG. 13 is a sectional view taken in the direction of the arrows on the section line 13—13 of FIG. 11.
Figure 14:
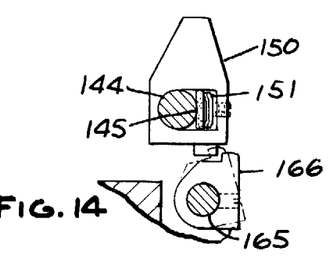
FIG. 14 is a sectional view taken in the direction of the arrows on the section line 14—14 of FIG. 11.

FIG. 12 shows the quill feed unit just before this takes place. It can be seen that cam 150 will be pushed back along bar 144 further and further during each feed cycle, the amount which cam 150 will be moved depends on the length of the feed cycle which is determined by the timer 143.

This is due to the fact that the slidable cam 150 can be adjusted very accurately by means of the tensioning device 151 so that there is enough friction on the bar 144 to prevent the cam from moving while cam 148 is being operated, but not enough to keep cam 150 from moving after cam 148 has been moved forward and has become, in effect, a positive stop.

For example, after the timer 143, activated by the limit switch 149, returns the quill 146 to its original starting position, the rapid retract being ended by cam 154 operating limit switch 155, the cam 150 which starts the feed cycle will be in the position designated by the letter B. It can be seen that when the quill unit rapid advances the second time, it will carry the tool 156 further into the workpiece 157 because the tool quill 137 must travel further to reach position B than it did to reach A., i.e., the quill will travel rapidly into the workpiece exactly to where the unit just stopped drilling before.

At this time, cam 148 will again be acted on by cam 150 to start a new feed cycle, which will push block 150 further back to position C before the quill retracts. Again, this distance is determined by the length of the feed cycle, which is governed by timer 143. It can be seen that the unit will again advance to where it left off. This will be repeated until the entire depth of the hole being drilled is reached.

The total depth of the hole desired is set by cam 158. When cam 158 contacts limit switch 159, the solenoid 160 is operated. Solenoid 160 operating through link 161 and crank 162 causes the rotatably mounted bar 165 to rotate. This, in turn, will cause the cam block 166 to rotate from its normal position of non-interference with cam 150 to a position where it will contact cam 150 and push it back to its original position as the tool quill 156 retracts from the workpiece 157 at the end of the peck-feed cycle. At the end of the retract cycle, cam 154 will contact limit switch 155 turning off the rapid retract and feed motors, and de-energize solenoid 160, allowing the spring 180 to reset the crank 162 and, therefore, resetting the cam block 166, readying the machine to start a new cycle.

To control the unit throughout the operations previously described, a control panel 167 (See FIG. 1) is provided, upon which are mounted the timers 69 and 143 previously described. A start and stop switch 168 is provided, as well as a feed switch 169, a rapid advance switch 170, a rapid return switch 171, and a no-feed switch 172 are provided, should it be desired to operate the unit manually for set up or other purposes.

It should be understood that while the illustrated embodiment of the invention shows only a single ball-screw assembly, where it is necessary, for heavy feed loads, etc., Applicant, within the scope of his invention, can easily provide two or more ball-screw assemblies to advance and retract the tool quill. Also, it can be easily seen that whether one or more ball-screw assemblies are used, any practicable number of tools may be mounted on one tool quill or more than one tool quill can be mounted to any one ball-screw assembly.

It should also be understood that Applicant's Mechanical Quill Feed Unit can be adapted to operate in any desired position, and is not restricted to the horizontal position shown.

By virtue of the above disclosed constructions, the objects of the present invention listed above, as well as numerous additional advantages are obtained.

I claim:

1. In combination, at least one mechanical quill feed unit for advancing and rotating a tool along an axis comprising a frame member, a movable but non-rotatable tool quill having a tool rotating means mounted thereon and adapted for reciprocative movement with respect to said frame member along said axis, said tool quill being connected to said frame member by a reversible ball-screw assembly comprising a rotatable ball-screw and an inter-engaging sleeve means coaxial with said axis with the forward end of said sleeve means being connected to said tool quill and said ball-screw being rotatably connected to said frame member, a tool holder coaxial with said axis connected to the output of said tool rotating means, a tool rotating operating means connected to the input of said tool rotating means said tool rotating means including a pair of gears located in said tool quill, said gears lying in a plane perpendicular to said axis and being immediately adjacent said tool holder, with one of said gears being directly connected to said tool holder, with said tool rotating operating means including a hollow splined slipshaft, means drivingly connecting said other of said gears to said slipshaft, said slipshaft being offset from said axis, a drive shaft drivingly connected to said hollow slipshaft and a drive motor operatively connected to said drive shaft, said tool quill also having tool quill control means to rapidly advance said tool quill toward a workpiece preparatory to performing a machining operation thereon, means to feed said tool quill at a controlled rate of speed while a machining operation is being performed, and to rapidly retract said tool quill to its original position when the machining operation is completed.

2. The device defined in claim 1, wherein said tool quill control means include, a reducing planetary gearset having a planetary output gear, a planetary input gear and a planetary input shaft, said ball-screw drivingly connected to said output gear, a rapid advance motor drivingly connected to said planetary input gear, a feed motor drivingly connected to said planetary input shaft, a brake connected to said rapid advance motor, means to activate and de-activate said brake, said rapid advance motor and said feed motor in such a manner that when the rapid advance motor is running, the brake will be de-energized and the ball-screw assembly will be directly driven by said planetary gearset, and when said rapid advance motor is off, said brake will be energized and said feed motor will drive said planetary gearset at a greatly reduced speed, means to rapidly retract said tool quill at the conclusion of the machining operation, and means to shut off said rapid advance and said feed motors when said tool quill reaches its starting position.

3. The device defined in claim 2, wherein said activating and de-activating means include means to start said rapid advance and said feed motor, a first limit switch and a second limit switch mounted to said frame member, a first cam mounting bar and a second cam mounting bar fixedly mounted to said tool quill in such a manner as to move in close proximity to their respective limit switches as said tool quill moves toward and away from the frame member, an adjustable cam block mounted on each of said bars and each adapted to contact and operate its respective limit switch at a predetermined time, said first limit switch being adapted to turn off said rapid advance motor and energize said brake, all simultaneously, and thus operate said quill feed unit in the feed mode, and said second limit switch being adapted to de-energize said brake and start said rapid advance motor in the reverse direction.

4. The device described in claim 2, wherein said means to turn off said rapid advance and said feed motor include a limit switch fixedly mounted to said frame member, a cam mounting bar fixedly mounted to said tool quill and adapted to move in close proximity to said limit switch, and an adjustable cam block mounted on said bar and adapted to operate said limit switch at a predetermined time, said limit switch being adapted to switch off said rapid advance and said feed motors.

5. The device defined in claim 1, and including a control rod fixedly mounted to said tool quill and adapted to pass through an opening in said frame member, an adjustable dwell stop collar provided on said control rod and adapted to interfere with said fram member when a desired position of said tool quill is reached, a timer, and a limit switch adapted to start said timer and allow said tool quill to advance to said positive stop, and then to reverse said tool quill control means to return said tool quill to its original position after a predetermined time.

6. The device defined in claim 1, wherein said tool quill control means include a non-reducing planetary gear having a planetary input shaft, a planetary output shaft, and a planetary input gear, said ball-screw being drivingly connected to said planetary output shaft, a rapid advance motor connected to said planetary input shaft, a brake connected to said rapid advance motor, a feed motor, a plurality of pick-off gears drivingly connecting said planetary input gear and said feed motor, means to activate and de-activate said brake, rapid advance motor, and said feed motor in such a manner that when the rapid advance motor is on, said brake will be de-energized and the ball-screw will be directly driven by said planetary gearset, and when said rapid advance motor is off, said brake will be energized and said ball-screw assembly will be indirectly driven at a substantially slower speed through said pick-off gears, means to rapidly retract said tool quill to its original position at the conclusion of a machining operation, and means to shut off said rapid advance and said feed motors when said tool quill reaches said original position.

7. The device defined in claim 6, wherein said activating and de-activating means include means to start said rapid advance and said feed motors, a first limit switch and a second limit switch mounted to said frame member, a first cam mounting bar and a second cam mounting bar fixedly mounted to said tool quill in such a manner as to move in close proximity to their respective limit switches as said tool quill moves toward or away from said frame member, an adjustable cam block mounted on each of said bars and each adapted to contact and operate its respective limit switch at a predetermined time, said first limit switch being adapted to turn off said rapid advance motor and energize said brake, all simultaneously, and thus operate said quill feed unit in the feed mode, and said second limit switch being adapted to de-energize said brake and start said rapid advance motor in the reverse direction.

8. The device defined in claim 6, wherein said means to shut off said rapid advance and said feed motors include a limit switch fixedly mounted to said frame member, a cam mounting bar fixedly mounted to said tool quill and adapted to move in close proximity to said limit switch as said tool quill moves, and an adjustable cam block mounted on said bar and adapted to operate said limit switch at a predetermined time, said limit switch being adapted to switch off said rapid advance and said feed motor.

9. The device defined in claim 1, wherein said tool quill control means include, a dual purpose over-running clutch having a first portion and a second prtion, an input shaft operatively connected to said first portion, an output shaft operatively connected to said second portion, an input gear connected to said second portion and therethrough to said output shaft, said output shaft drivingly connected to said ball-screw, a rapid advance motor connected to said input shaft, a feed motor carried by said frame member, a plurality of spur gears connected to said feed motor, a pair of helical gears connecting said spur gears to said over-running clutch input gear, means to activate and de-activate said clutch, said rapid advance motor and said feed motor, in such a manner that when said rapid advance motor is on, said first portion of said clutch will be disengaged disconnecting said feed motor and letting the rapid advance motor directly drive said ball-screw assembly, and when the rapid advance motor is off, said second portion of said clutch will be engaged, causing the feed motor to indirectly drive said ball-screw through said helical gears and said input gear, means to rapidly retract said tool quill to its original position, and means to shut off said rapid advance and said feed motor when said tool quill reaches said original position.

10. The device defined in claim 9, wherein said activating and de-activating means include means to start said rapid advance and said feed motors, a first limit switch and a second limit switch mounted to said frame member, a first cam mounting bar and a second cam mounting bar fixedly mounted to said tool quill in such a manner as to move in close proximity to their respective limit switches as said tool quill moves, an adjustable cam block mounted on each of said bars and each adapted to contact and operate its respective limit switch at a predetermined time, said first limit switch being adapted to turn off said rapid advance motor and energize said second portion of said clutch, and thereby operate said quill unit in the feed mode, and said second limit switch being adapted to energize said first portion of said clutch and start said rapid advance motor in the reverse direction.

11. The device defined in claim 9, wherein said means to turn off said rapid advance and said feed motor include a limit switch fixedly mounted to said frame member, a cam mounting bar fixedly mounted to said tool quill and adapted to move in close proximity to said limit switch, and an adjustable cam block mounted on said bar and adapted to operate said limit switch at a predetermined time, said limit switch being adapted to switch off said rapid advance and said feed motor.

12. The device described in claim 1, wherein said tool quill control means include, a spur gear drivingly connected to said ball screw, a non-reducing planetary gearset having an input shaft, an output shaft, and an input gear, means connecting said ball-screw to said output shaft, a rapid advance motor connected to said input shaft, a brake connected to said rapid advance motor, a feed motor mounted on said frame member at right angles to said rapid advance motor, a worm drivingly connected to said input gear, means drivingly connecting said feed motor and said worm, means to activate and de-activate said braking device, said rapid advance motor, and said feed motor in such a manner that when said rapid advance motor is on, said brake will be de-energized, and said tool quill will be rapidly driven by said rapid advance motor through said planetary gear, and when said rapid advance motor is off, said brake is energized such that said tool quill will be indirectly driven by the combination of said worm and said planetary gear, means to reverse said rapid advance motor and rapidly retract said tool quill to its original position, and means to shut off said rapid advance and said feed motors when said tool quill reaches said position.

13. The device defined in claim 12, wherein said activating and de-activating means include means to start said rapid advance and said feed motors, a first limit switch and a second limit switch mounted to said frame member, a first cam mounting bar and a second cam mounting bar fixedly mounted to said tool quill in such a manner as to move in close proximity to their respective limit switches, an adjustable cam block mounted on each of said bars and each adapted to contact and operate its respective limit switch at a predetermined time, said first limit switch being adapted to turn off said rapid advance motor and energize said brake, and said second limit swich being adapted to de-energize said brake and start said rapid advance motor in the reverse direction.

14. The device described in claim 12, wherein said means to turn off said rapid advance and said feed motor include a limit switch fixedly mounted to said frame member, a cam mounting bar fixedly mounted to said tool quill and adapted to move in close proximity to said limit switch, and an adjustable cam block mounted on said bar and adapted to operate said limit switch at a predetermined time, said limit switch being adapted to switch off said rapid advance and said feed motor.

15. The device defined in claim 1, and including positive dwell stop means.

16. The device defined in claim 3, wherein said tool quill control means include, a reducing planetary gearset having a planetary output gear, a planetary input gear, and a planetary input shaft, said ball-screw drivingly connected to said output gear, a rapid advance motor drivingly connected to said planetary input gear, a power take-off from said tool rotating operating means drivingly connected to said planetary input shaft, a brake connected to said rapid advance motor, means to activate and de-activate said brake, said rapid advance motor, and said power take-off in such a manner that when the rapid advance motor is running, the brake will be de-energized, and the ball-screw assembly will be directly driven by said planetary gearset, and when said rapid advance motor is off, said brake will be energized and said power take-off will drive said planetary gearset at a greatly reduced speed, means to rapidly retract said tool quill at the conclusion of the machining operation, and means to shut off said rapid advance motor and disconnect said power take-off when said tool quill reaches its starting position.

17. The device described in claim 16, wherein said means to turn off said rapid advance motor and disconnect said power take-off include a limit switch fixedly mounted to said frame member and adapted to turn off said rapid advance motor and disconnect said power take-off when operated, a cam mounting bar fixedly mounted to said tool quill and adapted to move in close proximity to said limit switch as said tool quill moves, and an adjustable cam block mounted on said bar and adapted to operate said limit switch at a predetermined time.

* * * * *